US012744719B2

(12) United States Patent
Cociglio

(10) Patent No.: US 12,744,719 B2
(45) **Date of Patent: *Sep. 22, 2026**

(54) ONE-WAY DELAY MEASUREMENT IN A PACKET-SWITCHED COMMUNICATION NETWORK

(71) Applicant: TELECOM ITALIA S.p.A., Milan (IT)

(72) Inventor: Mauro Cociglio, Turin (IT)

(73) Assignee: TELECOM ITALIA S.p.A., Milan (IT)

( * ) Notice: Subject to any disclaimer, the term of this patent is extended or adjusted under 35 U.S.C. 154(b) by 548 days.

This patent is subject to a terminal disclaimer.

(21) Appl. No.: 18/250,651

(22) PCT Filed: Oct. 28, 2021

(86) PCT No.: PCT/EP2021/079959

§ 371 (c)(1),
(2) Date: Apr. 26, 2023

(87) PCT Pub. No.: WO2022/090380

PCT Pub. Date: May 5, 2022

(65) Prior Publication Data

US 2023/0403221 A1 Dec. 14, 2023

(30) Foreign Application Priority Data

Oct. 29, 2020 (IT) ........................ 102020000025693

(51) Int. Cl.
*H04L 43/0852* (2022.01)
*H04L 43/106* (2022.01)

(52) U.S. Cl.
CPC ................................ *H04L 43/0858* (2013.01)

(58) Field of Classification Search
CPC . H04L 43/0858; H04L 43/026; H04L 47/283; H04L 43/0864; H04L 43/067; H04L 43/106
See application file for complete search history.

(56) References Cited

U.S. PATENT DOCUMENTS

| | | | | |
|---|---|---|---|---|
| 6,880,097 B1 * | 4/2005 | Frouin | .................. | H04J 3/0652 713/502 |
| 7,127,508 B2 * | 10/2006 | Edmison | ............... | H04L 47/115 709/224 |

(Continued)

FOREIGN PATENT DOCUMENTS

| | | | |
|---|---|---|---|
| CN | 103297288 A | 9/2013 | |
| WO | WO 2011/079857 A1 | 7/2011 | |
| WO | WO-2019206862 A1 * | 10/2019 | ........... H04L 43/022 |

OTHER PUBLICATIONS

International Search Report issued Feb. 9, 2022 in PCT/EP2021/079959 filed on Oct. 28, 2021, 3 pages.

(Continued)

*Primary Examiner* — Abdullahi E Salad
(74) *Attorney, Agent, or Firm* — Oblon, McClelland, Maier & Neustadt, L.L.P.

(57) ABSTRACT

A method for providing one-way delay measurements on a bidirectional packet flow exchanged between two nodes of a packet-switched network. Each packet of the bidirectional packet flow comprises a marking field. At predefined times, the two nodes start transmission of respective measurement packet blocks made of packets with marking field set equal to a measurement value. Each node continues transmission of the respective measurement packet block, until it starts receiving the measurement packet block transmitted by the other node. In response thereto, each node ends transmission of the respective measurement packet block. A measurement point placed on the path of the bidirectional packet flow (Continued)

detects the measurement packet blocks and provides one-way delay measurements based on their time properties. For example, the end-to-end one-way delay in a given direction may be measured as the duration of the measurement packet block transmitted in the opposite direction.

16 Claims, 3 Drawing Sheets

(56) References Cited

U.S. PATENT DOCUMENTS 7,787,438 B2 * 8/2010 Dowse ................ H04L 43/0858 713/400
7,912,164 B2 * 3/2011 Armstrong ........ H04W 56/0075 375/357
10,027,567 B2 * 7/2018 Cociglio ............. H04L 43/0858
12,047,263 B2 * 7/2024 Cociglio ............. H04L 43/0829
12,212,501 B2 * 1/2025 Cociglio ............... H04L 47/283
2012/0275333 A1 * 11/2012 Cociglio ............. H04L 65/4053 370/252
2014/0160975 A1 * 6/2014 Cociglio ............... H04L 43/106 370/252
2019/0182075 A1 * 6/2019 Chen ....................... H04L 47/13
2020/0252315 A1 8/2020 Cociglio et al.

OTHER PUBLICATIONS

Trammell et al., "The QUIC Latency Spin Bit; draft-ietf-quic-spin-exp-01", Internet Engineering Task Force, Oct. 23, 2018, 8 pages.
Fioccola et al., "Alternate-Marking Method for Passive and Hybrid Performance Monitoring" RFC 8321, Internet Engineering Task Force, Jan. 30, 2018, 33 pages.
Combined Chinese Office Action and Search Report issued Oct. 28, 2025, in corresponding Chinese Patent Application No. 202180073145.2 (with English Translation), 19 pages.

* cited by examiner

ONE-WAY DELAY MEASUREMENT IN A PACKET-SWITCHED COMMUNICATION NETWORK

TECHNICAL FIELD

The present invention relates to the field of communication networks. In particular, the present invention relates to one-way delay measurements in a packet-switched communication network.

BACKGROUND ART

In a packet-switched communication network, packet flows are transmitted from source nodes to destination nodes through possible intermediate nodes. Exemplary packet-switched networks are IP (Internet Protocol) networks, Ethernet networks and MPLS (Multi-Protocol Label Switching) networks.

Each packet is transmitted at a transmission time by the source node and is received at a reception time by the destination node. The time elapsing between transmission time and reception time is typically called "one-way delay". The one-way delay of a packet mainly depends on the number of possible intermediate nodes crossed by the packet from source to destination, the processing time of the packet by each node and the propagation time along the links.

WO 2011/079857, in the name of the same Applicant, discloses a method for performing one-way delay measurements on packets carrying live traffic (namely, packets not generated for the purpose of performing the measurement) which uses an alternate marking technique whereby the packet flow to be measured is divided into blocks of packets comprising a marking bit set to a first value (e.g. "1") and blocks of packets comprising a marking bit set to a second value (e.g. "0"). The marking value is periodically switched, so that the blocks of packets marked by the first value are interleaved with the blocks of packets marked by the second value.

Techniques are also known which provide RTT (round-trip time) measurements, instead of one-way delay measurements.

B. Trammel et al.: Internet draft "The addition of a Spin Bit to the QUIC Transport Protocol draft-trammel-quic-spin-01", Dec. 13, 2017 describes the addition of a so-called "latency spin bit" (or, briefly, "spin bit") in the QUIC header, which allows RTT measurements on a bidirectional packet flow exchanged between two nodes. According to the Internet draft, both the nodes (also termed "client" and "server") initially transmit the respective packets with the value of their spin bits set to 0. The client starts an RTT measurement by setting the value of its spin bit to 1. This change of spin bit value may be seen as an edge in the spin bit signal transmitted from client to server. As the server receives such edge, it changes the value of its own spin bit from 0 to 1. This way, the server substantially reflects the edge of the spin bit signal back to the client. As the client receives the reflected edge of the spin bit signal from the server, it switches the value of its spin bit back to 0. This may be seen as another edge in the spin bit signal transmitted from client to server, which is received at the server and reflected back to the client as described above. A rough RTT may then be measured at any intermediate measurement point placed between client and server, as the duration of a spin bit period, namely of the time lapsing between passage in a same direction (e.g. from client to server) of two consecutive edges of the spin bit signal.

SUMMARY OF THE INVENTION

The Applicant has noticed that the above spin bit technique is capable of providing RTT measurements by using a single measurement point placed on the path of the bidirectional packet flow to be measured. However, an RTT measurement disadvantageously does not provide an indication of the contribution which each one of the two counterpropagating directions provides to the overall RTT. If a measured RTT has a critical value, it is not possible to determine which direction (e.g. upstream or downstream) is e.g. affected by a congestion and therefore mostly contributes to the RTT.

The Applicant has then tackled the problem of providing a method for transmitting a bidirectional packet flow carrying live traffic exchanged between two nodes of a packet-switched communication network, which enables one-way delay measurements by a single measurement point placed on the path of the bidirectional packet flow.

In the following description and in the claims, the expression "enabling a one-way delay measurement" will designate an operation of marking and/or conditioning the packets of the bidirectional packet flow to be measured in such a way that a one-way delay measurement can be made by a measurement point placed on the path of the packet flow, either at an intermediate position of the path or at an endpoint of the path.

According to embodiments of the present invention, the above problem is solved by a method wherein each packet of the bidirectional packet flow carrying live traffic between the two nodes comprises a marking field settable to any of at least two different marking values. At respective predefined times (which may be a same predefined time for both the nodes), the nodes switch the marking value applicable to their respective outgoing packets of the bidirectional packet flow, thereby starting transmission of respective blocks of packets (also termed herein after "measurement packet blocks"). Each node continues transmission of the respective measurement packet block by keeping the applicable marking value unchanged, until it starts receiving the measurement packet block from the opposite node. In response thereto, the node ends transmission of its respective measurement packet block, by switching again the marking value applicable to its outgoing packets of the bidirectional packet flow.

Hence, each node basically transmits to the other node a measurement packet block made of a certain number of packets. Since both the nodes start transmission of the respective measurement packet blocks at the same time and end transmission of the respective measurement packet blocks as they start receiving the measurement packet block transmitted by the opposite node, the duration of the measurement packet block transmitted in a certain direction basically is equal to the end-to-end one-way delay in the opposite direction.

A measurement point placed on the path of the bidirectional packet flow may then detect the packets transmitted in a certain direction, read their marking value and provide an end-to-end one-way delay measurement in the opposite direction, as a difference between detection time of the first packet following the measurement packet block and detection time of the first packet of the measurement packet block.

If the measurement point has a local clock synchronized with the local clocks of the two nodes, it may also provide an upstream one-way delay measurement (namely, a one-way delay measurement between the node originating the detected measurement packet block and the measurement point) as a difference between detection time of the first packet of the measurement packet block and predefined period T0.

If the measurement point is capable of detecting the measurement packet blocks transmitted in both directions, end-to-end one-way measurements and upstream one-way delay measurements in the two directions may be provided, and also combined to provide a downstream one-way delay measurement in each direction (namely, a one-way delay measurement between the measurement point and the node terminating the measurement packet block transmitted in that direction).

Advantageously, all the above one-way delay measurements are provided by a single measurement point placed on the path of the bidirectional packet flow to be measured. It shall be noticed that the measurement point may be implemented and operated by an entity other than the entity managing the marking of the packets at the nodes of the communication network.

According to a first aspect, the present invention provides a method for transmitting a bidirectional packet flow between a first node and a second node of a packet-switched communication network, wherein each packet of the bidirectional packet flow comprises a marking field, the method comprising:

a) at respective predefined times, by the first node and the second node starting transmission of a first measurement packet block and second measurement packet block, respectively, each one of the first measurement packet block and second measurement packet block comprising at least one packet of the bidirectional packet flow with marking field set equal to a first marking value and a second marking value, respectively; and b) by the first node, continuing transmission of the first measurement packet block until the second measurement packet block starts being received from the second node and, in response thereto, ending transmission of the first measurement packet block by transmitting at least one further packet of the bidirectional packet flow with marking field set equal to a third marking value.

Preferably, the method further comprises:

b') by the second node, continuing transmission of the second measurement packet block until the first measurement packet block starts being received from the first node and, in response thereto, ending transmission of the second measurement packet block by transmitting at least one further packet of the bidirectional packet flow with marking field set equal to a fourth marking value.

According to an embodiment, the method further comprises:

c) by the first node, continuing transmitting to the second node packets of the bidirectional packet flow with marking field set equal to the fourth marking value until at least one packet of the bidirectional packet flow with marking field set equal to the fourth marking value is received from the second node and, in response thereto, transmitting at least one further packet of the bidirectional packet flow with marking field set equal to a fifth marking value.

Preferably, the first marking value is equal to the second marking value or the third marking value is equal to the fourth marking value.

Preferably, the method steps are repeated cyclically.

Preferably, the respective predefined times are substantially a same predefined time.

More preferably, the first node and the second node comprise reciprocally synchronized local clocks and step a) is started when these local clocks indicate a time n×T0, n being an integer index and T0 being a predefined time.

For example, the predefined period T0 may be higher than twice a maximum one-way delay between the first node and the second node. Alternatively, the predefined period T0 is set higher than twice (or, even more preferably, three times) a calculated round-trip time between the first node and the second node.

According to some embodiments, the first node ends transmission of the first measurement packet block even if start of reception of the second measurement packet block is not detected, if it determines that a predefined time T1 has lapsed since start of transmission of the first measurement packet block.

Preferably, the predefined time T1 is substantially equal to 50% T0.

According to some embodiments, each packet of the bidirectional packet flow further comprises a sampling field, step a) comprising, by at least the first node, setting the sampling field equal to a sampling value in the first packet of the first measurement packet block.

According to a second aspect, the present invention provides a method for performing a one-way delay measurement on a bidirectional packet flow transmitted between a first node and a second node of a packet-switched communication network, wherein each packet of the bidirectional packet flow comprises a marking field, the method comprising the steps of the method above and:

d) by a measurement point placed on a path of the bidirectional packet flow, detecting the first measurement packet block and providing the one-way delay measurement based on a time property of the first measurement packet block.

For example, step d) comprises providing a one-way delay measurement from the second node to the first node as a duration of the first measurement packet block.

Alternatively or in addition, the measurement point is synchronized with the first node and step d) comprises providing a one-way delay measurement from the first node to the measurement point as a difference between start of detection of the first measurement packet block at the measurement point and start of transmission of the first measurement packet block by the first node.

According to a third aspect, the present invention provides a node for a packet-switched communication network, the node being configured to exchange a bidirectional packet flow with a further node of the packet-switched communication network, wherein each packet of the bidirectional packet flow comprises a marking field, the node being configured to:

a) at a predefined time n×T0, start transmission of a first measurement packet block comprising at least one packet of the bidirectional packet flow with marking field set equal to a first marking value; and b) continue transmission of the first measurement packet block until a second measurement packet block comprising at least one packet of the bidirectional packet flow with marking field set equal to a second marking value starts being received from the other node and, in response thereto, end transmission of the first measurement packet block by transmitting at least one further packet of the bidirectional packet flow with marking field set equal to a third marking value, the node being configured to repeat steps a) and b) cyclically.

According to a fourth aspect, the present invention provides a packet-switched communication network comprising a first node and a second node exchanging a bidirectional packet flow, wherein each packet of the bidirectional packet flow comprises a marking field, wherein:

a) the first node and the second node are configured to, at respective predefined times, start transmission of a first measurement packet block and second measurement packet block, respectively, each one of the first measurement packet block and second measurement packet block comprising at least one packet of the bidirectional packet flow with marking field set equal to a first marking value and a second marking value, respectively; and b) the first node is further configured to continue transmission of the first measurement packet block until the second measurement packet block starts being received from the second node and, in response thereto, end transmission of the first measurement packet block by transmitting at least one further packet of the bidirectional packet flow with marking field set equal to a third marking value.

Preferably, the packet-switched communication network also comprising a measurement point placed on a path of the bidirectional packet flow, the measurement point being configured to detect the first measurement packet block and provide a one-way delay measurement based on a time property of the first measurement packet block.

BRIEF DESCRIPTION OF THE DRAWINGS

The present invention will become clearer from the following detailed description, given by way of example and not of limitation, to be read with reference to the accompanying drawings, wherein.

DETAILED DESCRIPTION OF PREFERRED EMBODIMENTS OF THE INVENTION

Figure 1:
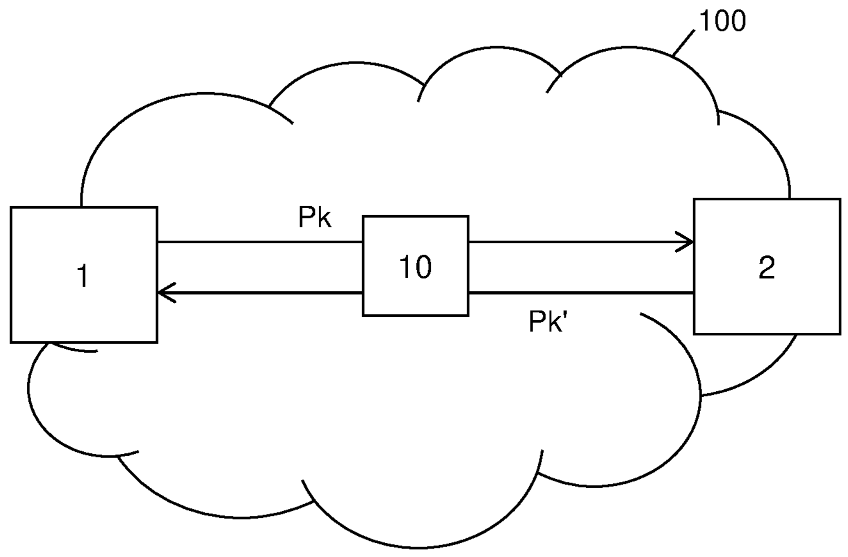
FIG. 1 schematically shows a packet-switched communication network in which the method for performing a one-way delay measurement according to embodiments of the present invention is implemented.

FIG. 1 schematically shows a packet-switched communication network 100 configured to perform a one-way delay measurement according to an embodiment of the present invention.

The communication network 100 comprises a plurality of nodes reciprocally interconnected by physical links according to any known topology, including two nodes 1 and 2 shown in FIG. 1. The nodes 1 and 2 may be connected by a single physical link or by the concatenation of several physical links and intermediate nodes (not shown in the drawings). The communication network 100 may be for instance an IP network.

The nodes 1, 2 are preferably provided with respective local clocks which are reciprocally synchronized. Such local clocks for example may cyclically count from 0 to Tmax. The synchronization error between the local clocks of the nodes 1, 2 is preferably lower than or equal to 1 ms. The synchronization between the local clocks of the nodes 1, 2 may be performed by using a synchronization protocol, such as for instance NTP (Network Time Protocol).

The nodes 1, 2 exchange a bidirectional packet flow including packets Pk transmitted from the node 1 to the node 2 and packets Pk' transmitted from the node 2 to the node 1, as schematically depicted in FIG. 1. The packets Pk, Pk' carry live traffic, namely they are not generated for the purpose of the one-way delay measurement. The packets Pk may belong to a same packet flow (namely, they may all have a same source address and a same destination address, e.g. a same IP source address and a same IP destination address) or to different packet flows whose paths are overlapping between the nodes 1 and 2. Similarly, the packets Pk' may belong to a same packet flow or to different packet flows whose paths are overlapping between the nodes 2 and 1.

The packets Pk, Pk' are formatted according to a certain network protocol. By way of non limiting example, the network protocol may be the above mentioned QUIC protocol.

Figure 2:
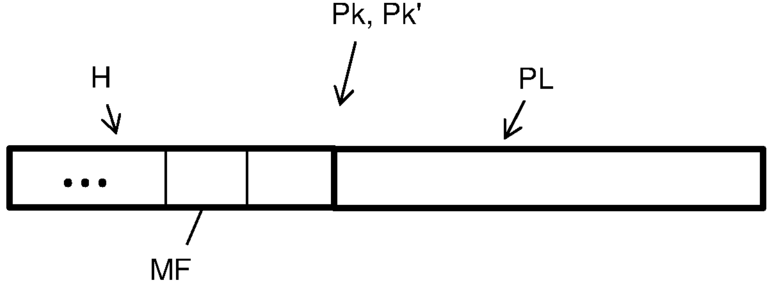
FIG. 2 schematically shows the structure of a packet exchanged in the communication network of FIG. 1, according to embodiments of the present invention.

In particular, as schematically depicted in FIG. 2, each packet Pk, Pk' comprises a payload PL comprising user data and at least one header H. In case of multiple headers, each header pertains to a different network layer. For example, each packet Pk, Pk' may comprise a network layer header (such as an IP header) and transport layer header (such as a QUIC+UDP header or a TCP header). One of the headers H (typically, the network layer header) comprises packet forwarding information, namely information allowing the packets Pk to reach the network node 2 and the packets Pk' to reach the node 1.

Each packet Pk, Pk' also preferably comprises at least one measurement dedicated field MF (also termed herein after "marking field") supporting a one-way delay measurement on the bidirectional packet flow Pk, Pk'. The marking field(s) MF may be comprised in the same header H as the packet forwarding information (as shown in FIG. 2), in a different header (if any) or in the payload PL. Assuming for example that the packets Pk, Pk' comprise a network layer header (such as an IP header) and a transport layer header (such as a QUIC header), the marking field(s) MF may be comprised in the transport layer header. The marking field MF comprises one or more bits, preferably a single bit. The marking field MF may be set to anyone of two alternative marking values, namely an idle marking value M0 (e.g. "0") and measurement marking value M1 (e.g. "1"). By way of non-limiting example, if the packets Pk, Pk' are formatted according to the QUIC protocol, the marking field MF may be the spin bit comprised in the QUIC header as disclosed in the above Internet draft of B. Trammel et al.

Each node 1, 2 appropriately sets the value of the marking field MF in its respective outgoing packets Pk, Pk', before transmitting them, so as to enable a one-way delay measurement.

Figure 3:
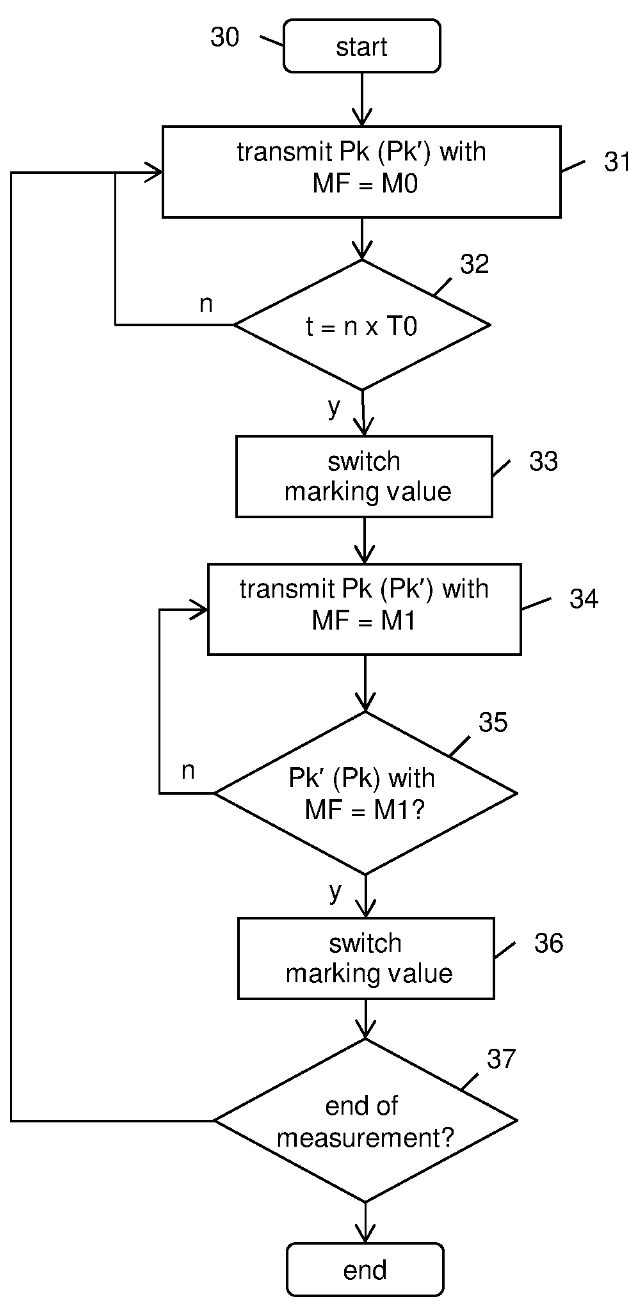
FIG. 3 is a flow chart of the operation of the nodes of the communication network of FIG. 1, according to an embodiment of the present invention.

In particular, with reference to the flow chart of FIG. 3, each node 1, 2 initially sets the marking field MF of its outgoing packets Pk, Pk' to the idle value M0 (step 31).

Each node 1, 2 continues transmitting its outgoing packets Pk, Pk' with their marking field MF set to the idle value M0, until its local clock indicates a respective predefined time (step 32). According to a preferred embodiment, the predefined time is t=n×T0 (n being an integer index equal to 1, 2, . . . ) for both the nodes 1, 2. The period T0 preferably is a submultiple of the maximum time Tmax counted by the local clock of the node 1, 2. For example, if Tmax is equal to 1000 ms, T0 may be equal to 10 ms, 20 ms or 25 ms. If, for example, T0 is equal to 25 ms, the condition at step 32 will be met at t=25 ms, t=50 ms, t=75 ms, . . . and t=1000 ms. Further considerations on the choice of T0 will be provided herein below.

When the node 1, 2 determines that t=n×T0, it preferably switches the marking value applicable to its outgoing packets Pk, Pk' (step 33) from the previously applied idle value M0 to the measurement value M1. It shall be noticed that, since the nodes 1, 2 are provided with reciprocally synchronized clocks, they perform the switching step 33 substantially at the same time (where “substantially” means short of synchronization errors between their local clocks). The node 1, 2 performs the switching step 33 if it is currently transmitting outgoing packets Pk, Pk' with marking field MF equal to the idle marking value M0.

If the switching step 33 is performed, the node 1, 2 then starts transmitting its outgoing packets Pk, Pk' with their marking field MF set to the measurement value M1 (step 34).

While the node 1, 2 is transmitting its outgoing packets Pk, Pk' to the other node 2, 1, it also receives incoming packets Pk', Pk from the other node 2, 1. The node 1, 2 preferably continuously reads the value of the marking field MF of such incoming packets Pk', Pk.

As long as the node 1, 2 receives incoming packets Pk', Pk with their marking field MF set to the idle value M0, it preferably continues transmitting its outgoing packets Pk, Pk' with their marking field MF set to the measurement value M1 (step 34).

When, instead, the node 1, 2 starts receiving incoming packets Pk', Pk with their marking field MF set to the measurement value M1 (step it preferably switches the marking value applicable to its outgoing packets Pk, Pk' back from the measurement value M1 to the idle value M0 (step 36).

The start of the reception of incoming packets Pk', Pk with their marking field MF set to the measurement value M1 is preferably identified as the reception of an incoming packet Pk', Pk with its marking field MF set to the measurement value M1 and preceded by at least one incoming packet Pk', Pk with its marking field MF set to the idle value M0. In order to avoid that reception sequence errors amongst such incoming packets Pk', Pk make this determination inaccurate, the packets Pk, Pk' preferably comprise a sequence number, which each node 1, 2 uses at step 35 to recover the proper sequence of incoming packets Pk', Pk.

Preferably, the node 1, 2 performs the switching step 36 only if it is currently transmitting its outgoing packets Pk, Pk' with their marking field MF set to the measurement marking value M1. Otherwise, the node 1, 2 does not perform any switching step 36 and continues transmitting its outgoing packets Pk, Pk' with their marking field MF set to the idle value M0.

If the switching step 36 is performed, the node 1, 2 then restarts transmitting its outgoing packets Pk, Pk' with their marking field MF set to the idle value M0 (step 31).

The node 1, 2 repeats steps 31-36 cyclically at each time t=n×T0, until the end of the measurement session (step 37).

Hence, at each cycle where both the switching steps 33 and 36 are performed, between the two switching steps 33, 36 each node 1, 2 basically transmits to the opposite node 2, 1 a measurement packet block made of a certain number of packets Pk, Pk' comprising the measurement value M1. Since both the nodes 1, 2 start transmission of the respective measurement packet blocks substantially at the same time t=n×T0 (where “substantially” means short of synchronization errors between their local clocks) and stop transmission of the respective measurement packet blocks as they start receiving the measurement packet block transmitted by the opposite node 2, 1, the duration of the measurement packet block transmitted in a certain direction basically is equal to the end-to-end one-way delay in the opposite direction.

A measurement point 10 placed on the path of the bidirectional packet flow Pk, Pk' as depicted in FIG. 1 may then detect the packets transmitted in a certain direction (e.g. the packets Pk transmitted from the node 1 to the node 2), read their marking value and provide for each cycle an end-to-end one-way delay measurement OWD(2→1) in the opposite direction (namely from the node 2 to the node 1), as a difference between detection time of the first packet Pk following the measurement packet block and detection time of the first packet Pk of the measurement packet block.

If also the measurement point 10 has a local clock synchronized with the local clocks of the nodes 1, 2, it may also provide for each cycle an upstream one-way delay measurement OWD(1→10) (namely, a one-way delay measurement between the node 1 originating the measurement packet block and the measurement point as a difference between detection time of the first packet Pk of the measurement packet block and start time of the cycle n×T0.

If the measurement point 10 is capable of detecting also measurement packet blocks transmitted from the node 2 to the node 1, for each cycle also an end-to-end one-way delay measurement OWD(1→2) from the node 1 to the node 2 and an upstream one-way delay measurement OWD(2→10) may be provided.

All such measurements may be combined to provide a downstream one-way delay measurement in each direction, according to the following equations:

$$OWD(10\rightarrow 2)=OWD(1\rightarrow 2)-OWD(1\rightarrow 10);$$

$$OWD(10\rightarrow 1)=OWD(2\rightarrow 1)-OWD(2\rightarrow 10).$$

Advantageously, all the above one-way delay measurements are provided by a single measurement point 10 placed on the path of the bidirectional packet flow Pk, Pk' to be measured.

Figure 4:
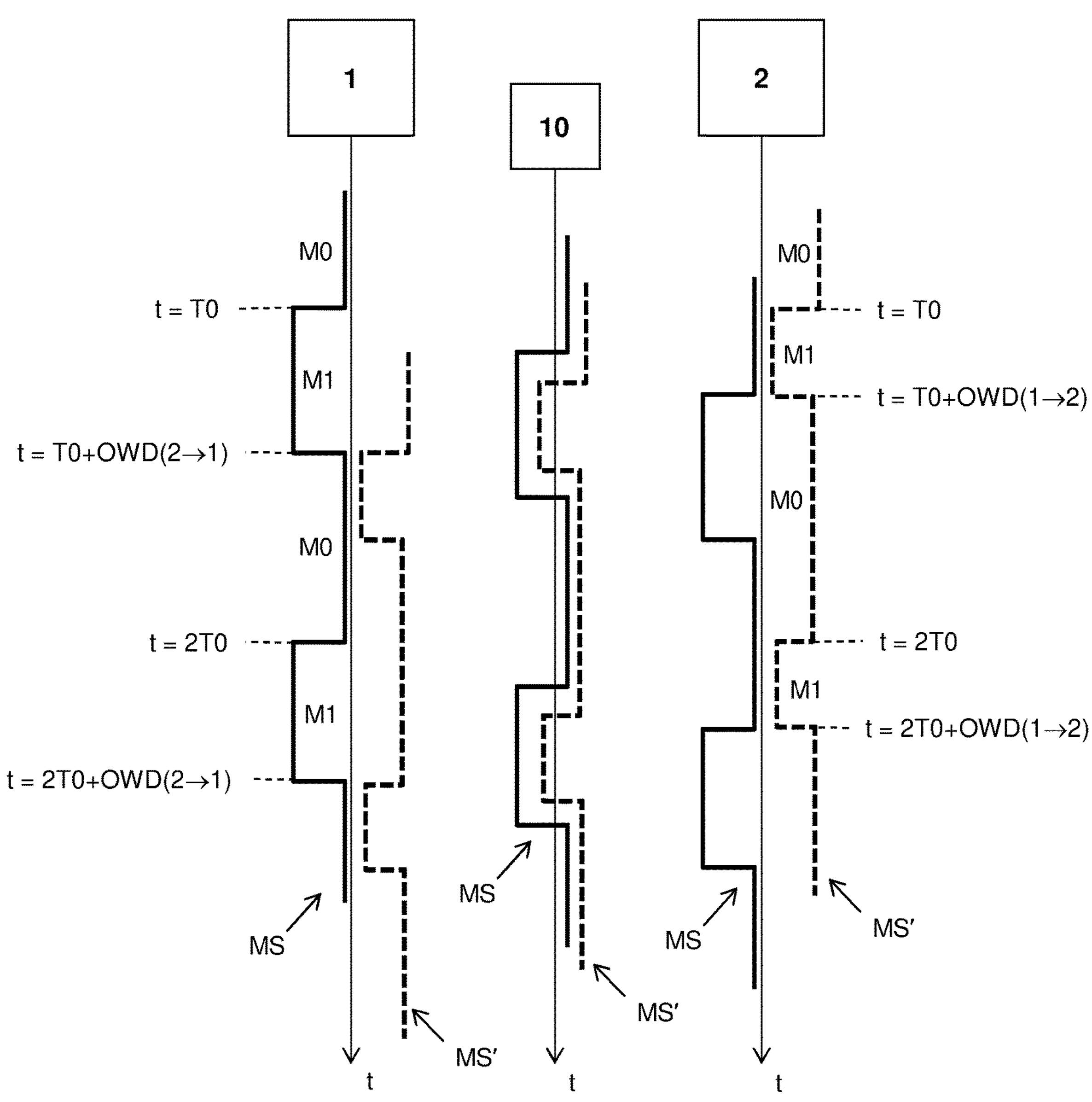
FIG. 4 is a time diagram schematically depicting the operation of the nodes according to the flow charts of FIG. 3.

FIG. 4 is an example of the operation of the nodes 1 and 2 and measurement point 10 according to the flow chart of FIG. 3.

In FIG. 4, the solid line indicates the marking signal MS carried by the packets Pk transmitted from the node 1 to the node 2, whereas the dashed line indicates the marking signal MS' carried by the packets Pk' transmitted from the node 2 to the node 1. As “marking signal” it is meant the sequence of marking values M0, M1 written in the marking fields MF of the packets Pk, Pk' transmitted in a certain direction. A switching of the marking value in the packets Pk, Pk' from M0 to M1 or vice versa determines an edge in the respective marking signal MS, MS'.

As shown in FIG. 4, initially both the nodes 1, 2 apply to their outgoing packets the idle marking value M0 (step 31). Substantially at a same time T0 (where “substantially” means short of synchronization errors between their local clocks), both the nodes 1, 2 switch the marking value applicable to their respective outgoing packets Pk, Pk' from the idle value M0 to the measurement marking value M1 (step 33). Before deciding to perform such switching, each node 1, 2 preferably checks that a minimum number Nmin of outgoing packets Pk, Pk' with marking field MF equal to the idle marking value M0 have already been transmitted.

The switching step 33 determines a first edge in both the marking signals MS, MS'. Due to the propagation delay from the node 1 to the node 2, the first edge of the marking signal MS is received at the node 2 at t=T0+OWD(1→2), while due to the propagation delay from the node 2 to the node 1, the first edge of the marking signal MS' is received at the node 1 at t=T0+OWD(2→1). By way of non limiting example, it is assumed that—due to asymmetry of the connection between the nodes 1 and 2—the one-way delay OWD(1→2) is shorter than the one-way delay OWD(2→1). Hence, the first edge of the marking signal MS is received at the node 2 before the first edge of the marking signal MS' is received at the node 1.

At=T0+OWD(1→2), the node 2 receives the first edge of the marking signal MS, namely it starts receiving incoming packets Pk with marking field MF equal to the marking value M1 (step 35). Hence, since it is currently transmitting its outgoing packets Pk' with marking field MF equal to the measurement value M1, the node 2 preferably switches the marking value applicable to its outgoing packets Pk' back from the measurement value M1 to the idle value M0 (step 36). The switching step 36 determines a second edge in the marking signal MS'.

On the other hand, at =T0+OWD(2→1), the node 1 receives the first edge of the marking signal MS', thereby detecting a switching of the marking value in the incoming packets Pk' which are being received from the node 2 from the idle value M0 to the marking value M1 (step 35). Hence, since it is currently transmitting its outgoing packets Pk with marking field MF equal to the measurement value M1, the node 1 preferably switches the marking value applicable to its outgoing packets Pk back from the measurement value M1 to the idle value M0 (step 36). The switching step 36 determines a second edge in the marking signal MS.

Both the nodes 1 and 2 continue to transmit their respective outgoing packets Pk, Pk' with marking field MF equal to the idle value M0, until a new cycle begins at t=2T0. The operation of the nodes 1, 2 during the second cycle is the same as in the first cycle, hence a detailed description will not be repeated.

The measurement point 10 may then detect the marking signal MS and/or MS' and provide one-way delay measurements based on them.

In particular, at the first cycle the measurement point 10 may provide an end-to-end one-way delay measurement OWD(2→1) as the time lapsing between detection of the first edge of the marking signal MS (corresponding to the first packet Pk of the measurement packet block transmitted by the node 1) and detection of the second edge of the marking signal MS (corresponding to the first packet Pk following the measurement packet block transmitted by the node 1). If the measurement point 10 has a local clock synchronized with the nodes 1, 2, it may also provide an upstream one-way delay measurement OWD(110) as the time lapsing between cycle start time T0 and detection of the first edge of the marking signal MS. The same measurements may be repeated for the second cycle and for any subsequent cycle.

Similarly, at the first cycle the measurement point 10 may provide an end-to-end one-way delay measurement OWD (1→2) as the time lapsing between detection of the first edge of the marking single MS' (corresponding to the first packet Pk' of the measurement packet block transmitted by the node 2) and detection of the second edge of the marking signal MS' (corresponding to the first packet Pk' following the measurement packet block transmitted by the node 2). If the measurement point 10 has a local clock synchronized with the nodes 1, 2, it may also provide an upstream one-way delay measurement OWD(2→10) as the time lapsing between cycle start time T0 and detection of the first edge of the marking signal MS'. The same measurements may be repeated for the second cycle and for any subsequent cycle.

Such measurements may also be combined to provide a downstream one-way delay measurement in each direction, according to the equations set forth above.

As described above, the period T0 preferably is a submultiple of the maximum time Tmax counted by the local clocks of the nodes 1, 2.

The period T0 is also preferably chosen so as to maximize the probability that, within each cycle of duration T0, the conditions whereby the nodes 1, 2 decide to perform the switching steps 33 and 36 are met. For this purpose, in principle T0 shall be set to a value higher than twice the maximum one-way delay between the nodes 1 and 2. Hence, if a rough estimate of the maximum one-way delay between the nodes 1 and 2 is known a priori (e.g. based on the length of the connection between the nodes 1 and 2), T0 may be set to a value higher than twice such rough estimate, for example T0=1000 ms.

According to a variant, the period T0 is set to a value higher than a previously calculated RTT between the nodes 1, 2. For example, the period T0 may be set equal to the minimum submultiple of Tmax which is higher than twice (or, even more preferably, three-times) a previously calculated RTT between the nodes 1, 2. According to this variant, the RTT may be calculated before start of a one-way delay measurement session by using any known technique for calculating the RTT.

Once the RTT has been measured, the rule for calculating T0 as a function of the measured RTT shall be the same for both the nodes 1, 2 (and possibly the measurement point 10), so that the period T0 is substantially the same for both the nodes 1, 2 (and possibly the measurement point 10). Then, both the nodes 1, 2 start monitoring their local clocks for initiating the first measurement cycle when their local clocks become equal to n×T0.

It may be appreciated that the nodes 1, 2 may start monitoring their respective local clocks at different times. For example, during the first cycle, only one node 1, 2 might start transmission of the respective measurement packet block, while the other node 2,1 might still be completing the initialization or calibration phases preliminary to the monitoring. The node 1, 2 which started transmission of the respective measurement packet block would therefore receive no incoming packet Pk', Pk with marking field equal to the measurement value M1 from the other node during the first cycle, and hence it would not end transmission of the measurement packet block.

In order to obviate this drawback, the node 1, 2 which likely completes the initialization or calibration phase first is preferably configured to wait a predefined time (e.g. RTT/2) before it starts monitoring its own local clock for initiating the first measurement cycle.

In order to further obviate this drawback, according to a variant of the method shown in FIG. 3 and described above, each node 1, 2 performs the check 35 until a time T1 has lapsed since the start time n×T0 of the current cycle. If the outcome of the check 35 continues being negative when T1 expires, then the node 1, 2 performs anyway the switching step 36 whereby it stops transmission of the current measurement packet block. The value of T1 is preferably the same for both the nodes 1, 2. The time T1 is preferably higher than a maximum one-way delay between the nodes 1 and 2. The time T1 is preferably substantially equal to 50% T0. In this case, since the period T0 shall be higher than T1 plus the maximum one-way delay, the period T0 is preferably higher than twice the maximum one-way delay.

This guarantees that, before the next cycle begins, transmission of the current measurement packet block is ended by the node 1, 2 even if, for some reasons (e.g. because the two nodes 1, 2 start monitoring their local clocks for initiating the first measurement cycle at different times, as discussed above), during the current cycle the other node 2, 1 has not started transmission of the respective measurement packet block. The duration of the measurement packet block in this case is equal to T1, and not to the one-way delay in the opposite direction. Hence, the measurement packet block does not allow the measurement point 10 to provide any one-way delay measurement relating to that cycle period. For this reason, according to such variant the measurement point 10 is preferably configured to ignore one-way delay measurements whose value is substantially equal to T1.

According to a variant of the method shown in FIG. 3 and described above, the packets Pk, Pk' may additionally comprise a sampling field SF. The sampling field SF is alternatively settable to any of a non sampling value S0 and a sampling value S1.

According to such variant, the nodes 1, 2 normally set the sampling field SF of their outgoing packets Pk, Pk' equal to the non sampling value S0. As each node 1, 2 performs the switching step 33 and starts setting the marking field MF in its outgoing packets Pk equal the measurement value M1, it also preferably sets the sampling field SF of one of its outgoing packets Pk, Pk' equal to the sampling value S1. Preferably, such one packet Pk, Pk' is the first packet to be transmitted following the switching step 33. Further, as each node 1, 2 performs the switching step 36 and starts setting the marking field MF in its outgoing packets Pk equal the idle value M0, it also preferably sets the sampling field SF of one of its outgoing packets Pk, Pk' equal to the sampling value S1. Preferably, such one packet Pk, Pk' is the first packet to be transmitted following the switching step 36.

This way, the measurement point 10 may more reliably identify the first packet of each measurement packet block and the first packet following each measurement packet block, as those packets whose sampling field SF is equal to the sampling value S1. The one-way delay measurements provided by the measurement point 10 (which, as described above, rely on the detection times, at the measurement point 10, of the first packet of each measurement block and the first packet following each measurement block) are then more accurate.

Preferably, the sampling field SF of the first packet Pk, Pk' to be transmitted following the switching step 36 is set to the sampling value S1 only if the packet is transmitted by the node 1, 2 within a predefined time T2 since the start time n×T0 of the current cycle, namely since the switching step 33. Since packets Pk, Pk' belong to a real traffic flow and their transmission times are unpredictable, this guarantees that for each cycle a sample packet is provided only if its transmission time is not too different from the one assumed by the measurement point 10, which accordingly may provide an accurate one-way sample measurement.

Though in the above description it has been assumed that both the nodes 1, 2 use a same measurement marking value M1 and a same idle marking value M0 for marking their respective outgoing packets Pk, Pk', this is not limiting. According to other embodiments, each node 1,2 may use a respective measurement marking value and/or a respective idle marking value. For example, if the marking field MF is a single-bit field, the node 1 may use "1" as measurement value and "0" as idle value, while the node 2 may use "0" as measurement value and "1" as marking value.

According to an advantageous variant, the marking field MF may comprise at least two bits, thereby providing at least 4 possible marking values including, for example, an idle marking value M0 (e.g. "00") and 3 measurement marking values M1, M2, M3 (e.g. "01", "10" and "11").

According to such advantageous variant, each node 1, 2 initially sets the marking field MF of its outgoing packets Pk, Pk' to the idle value M0, until its local clock indicates a time t=n×T0. Then, the node 1, 2 preferably switches the marking value applicable to its outgoing packets Pk, Pk' from M0 to M1, thereby starting transmitting its outgoing packets Pk, Pk' with their marking field MF set to M1.

As long as the node 1, 2 receives incoming packets Pk', Pk with their marking field MF set to the idle value M0, it preferably continues transmitting its outgoing packets Pk, Pk' with their marking field MF set to M1.

When, instead, the node 1, 2 starts receiving incoming packets Pk', Pk with their marking field MF set to M1 while it is transmitting its outgoing packets Pk, Pk' with marking field MF equal to M1, it preferably switches the marking value applicable to its outgoing packets Pk, Pk' from M1 to M2. This way, the node 1, 2 starts transmitting its outgoing packets Pk, Pk' with their marking field MF set to M2. According to an advantageous embodiment, if the node 1, 2 does not start receiving incoming packets Pk', Pk with their marking field MF set to M1 within a time T1 since the beginning of the current measurement cycle (where T1 is preferably equal to 50% T0), it preferably switches the applicable marking value from M0 directly to M3 or M0, so that the measurement point 10 may detect the forced end of the first marking M1.

As long as the node 1, 2 receives incoming packets Pk', Pk with their marking field MF set to M1, it preferably continues transmitting its outgoing packets Pk, Pk' with their marking field MF set to M2.

When, instead, the node 1, 2 starts receiving incoming packets Pk', Pk with their marking field MF set to M2 while it is transmitting its outgoing packets Pk, Pk' with marking field MF equal to M2, it preferably switches the marking value applicable to its outgoing packets Pk, Pk' from M2 to M3. This way, the node 1, 2 starts transmitting its outgoing packets Pk, Pk' with their marking field MF set to M3.

Transmission of packets Pk, Pk' with their marking field MF set to the measurement value M3 continues until the next measurement cycle begins.

The start of the reception of incoming packets Pk', Pk with their marking field MF set to the measurement value M1 (or M2) is preferably identified as the reception of an incoming packet Pk', Pk with its marking field MF set to the measurement value M1 (or M2) and preceded by at least one incoming packet Pk', Pk with its marking field MF set to M0 (or M1). In order to avoid that reception sequence errors amongst such incoming packets Pk', Pk make this determination inaccurate, the packets Pk, Pk' preferably comprise a sequence number, which each node 1, 2 uses to recover the proper sequence of incoming packets Pk', Pk.

According to this embodiment, the measurement point 10 may perform anyone of the following measurements:

one-way delay from node 1, 2 to measurement point 10 as time lapsing between start of the current measurement cycle and detection of the first packet Pk, Pk' with marking field set to M1;

one-way delay from node 2, 1 to node 1, 2 as time lapsing between detection of the first packet Pk, Pk' with marking field set to M1 and detection of the first packet Pk, Pk' with marking field set to M2;

one-way delay from node 1, 2 to node 2, 1 as time lapsing between detection of the first packet Pk, Pk' with marking field equal to M2 and detection of the first packet Pk, Pk' with marking field equal to M3; and round-trip time between node 1, 2 and node 2, 1 as time lapsing between detection of the first packet Pk, Pk' with marking field equal to M1 and detection of the first packet Pk, Pk' with marking field equal to M3.

Preferably, according to this embodiment the period T0 is higher than a maximum RTT plus a maximum one-way delay, so as to minimize the risk that the first packet with marking field equal to M3 reaches the other node after the beginning of the next measurement cycle. More preferably, the period T0 is higher than 3 times a calculated RTT. For example, T0 may be set equal to 1000 ms.

Also according to this embodiment, the packets Pk, Pk' may include also a sample field SF, in addition to the marking field MF. The sampling field SF is alternatively settable to any of a non sampling value S0 and a sampling value S1.

The nodes 1, 2 normally set the sampling field SF of their outgoing packets Pk, Pk' equal to the non sampling value S0.

As each node 1, 2 performs a switching of the marking value applicable to the marking field MF (from M0 to M1 at the beginning of the first measurement cycle, from M1 to M2, from M2 to M3 and then back from M3 to M1 at the beginning of the next measurement cycle), it also preferably sets the sampling field SF of one of its outgoing packets Pk, Pk' equal to the sampling value S1. Preferably, such one packet Pk, Pk' is the first packet to be transmitted following the switching.

The invention claimed is:

1. A method for transmitting a bidirectional packet flow between a first node and a second node of a packet-switched communication network, wherein each packet of said bidirectional packet flow comprises a marking field, said method comprising:

a) at respective predefined times, by said first node and said second node starting transmission of a first measurement packet block and second measurement packet block, respectively, each one of said first measurement packet block and second measurement packet block comprising at least one packet of said bidirectional packet flow with marking field set equal to a first marking value and a second marking value, respectively; and b) by said first node, continuing transmission of said first measurement packet block until said second measurement packet block starts being received from said second node and, in response thereto, ending transmission of said first measurement packet block by transmitting at least one further packet of said bidirectional packet flow with marking field set equal to a third marking value, wherein said respective predefined times are substantially a same predefined time, and wherein said first node and said second node comprise reciprocally synchronized local clocks and wherein step a) is started when said local clocks indicate a time n×T0, n being an integer index and T0 being a predefined period.

2. The method according to claim 1, wherein it further comprises:

b') by said second node, continuing transmission of said second measurement packet block until said first measurement packet block starts being received from said first node and, in response thereto, ending transmission of said second measurement packet block by transmitting at least one still further packet of said bidirectional packet flow with marking field set equal to a fourth marking value.

3. The method according to claim 2, wherein it further comprises:

c) by said first node, continuing transmitting to said second node packets of said bidirectional packet flow with marking field set equal to said fourth marking value until at least one packet of said bidirectional packet flow with marking field set equal to said fourth marking value is received from said second node and, in response thereto, transmitting at least one further packet of said bidirectional packet flow with marking field set equal to a fifth marking value.

4. The method according to claim 2, wherein said first marking value is equal to said second marking value or said third marking value is equal to said fourth marking value.

5. The method according to claim 1, wherein the method steps are repeated cyclically.

6. The method according to claim 1, wherein said predefined period T0 is higher than twice a maximum one-way delay between said first node and said second node.

7. The method according to claim 1, wherein said predefined period T0 is set higher than twice a calculated round-trip time between said first node and said second node.

8. The method according to claim 1, wherein said first node ends transmission of said first measurement packet block even if start of reception of said second measurement packet block is not detected, if it determines that a predefined time T1 has lapsed since start of transmission of said first measurement packet block.

9. The method according to claim 8, wherein said predefined time T1 is substantially equal to 50% T0.

10. The method according to claim 1, wherein each packet of said bidirectional packet flow further comprises a sampling field, said step a) comprising, by at least said first node, setting said sampling field equal to a sampling value in the first packet of said first measurement packet block.

11. A method for performing a one-way delay measurement on a bidirectional packet flow transmitted between a first node and a second node of a packet-switched communication network, wherein each packet of said bidirectional packet flow comprises a marking field, said method comprising the steps of the method according to claim 1, and:

d) by a measurement point placed on a path of said bidirectional packet flow, detecting said first measurement packet block and providing said one-way delay measurement based on a time property of said first measurement packet block.

12. The method according to claim 11, wherein step d) comprises providing a one-way delay measurement from said second node to said first node as a duration of said first measurement packet block.

13. The method according to claim 11, wherein said measurement point is synchronized with said first node and wherein step d) comprises providing a one-way delay measurement from said first node to said measurement point as a difference between start of detection of said first measurement packet block at said measurement point and start of transmission of said first measurement packet block by said first node.

14. A node for a packet-switched communication network, said node being configured to exchange a bidirectional packet flow with a further node of said packet-switched communication network, wherein each packet of said bidirectional packet flow comprises a marking field, said node including at least one processor being configured to:

a) start transmission of a first measurement packet block comprising at least one packet of said bidirectional packet flow with marking field set equal to a first marking value; and b) continue transmission of said first measurement packet block until a second measurement packet block comprising at least one packet of said bidirectional packet flow with marking field set equal to a second marking value starts being received from said other node and, in response thereto, end transmission of said first measurement packet block by transmitting at least one further packet of said bidirectional packet flow with marking field set equal to a third marking value, said node being configured to repeat steps a) and b) cyclically, wherein said node and said other node start transmission of the first measurement packet block and second measurement packet block, respectively, at substantially a same predefined time, and wherein said first node and said second node comprise reciprocally synchronized local clocks and wherein step a) is started when said local clocks indicate a time n×T0, n being an integer index and T0 being a predefined period.

15. A packet-switched communication network comprising a first node and a second node exchanging a bidirectional packet flow, wherein each packet of said bidirectional packet flow comprises a marking field, wherein:

a) said first node and said second node each include at least one processor configured to, at respective predefined times, start transmission of a first measurement packet block and second measurement packet block, respectively, each one of said first measurement packet block and second measurement packet block comprising at least one packet of said bidirectional packet flow with marking field set equal to a first marking value and a second marking value, respectively; and b) said first node is further configured to continue transmission of said first measurement packet block until said second measurement packet block starts being received from said second node and, in response thereto, end transmission of said first measurement packet block by transmitting at least one further packet of said bidirectional packet flow with marking field set equal to a third marking value, wherein said respective predefined times are substantially a same predefined time, and wherein said first node and said second node comprise reciprocally synchronized local clocks and wherein step a) is started when said local clocks indicate a time n×T0, n being an integer index and T0 being a predefined period.

16. The packet-switched communication network according to claim 15, further comprising a measurement point placed on a path of said bidirectional packet flow, said measurement point being configured to detect said first measurement packet block and provide a one-way delay measurement based on a time property of said first measurement packet block.

* * * * *